(12) United States Patent
Furudate

(10) Patent No.: US 8,837,648 B2
(45) Date of Patent: Sep. 16, 2014

(54) OFDM COMMUNICATION RECEPTION DEVICE

(75) Inventor: Hideki Furudate, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 366 days.

(21) Appl. No.: 13/109,146

(22) Filed: May 17, 2011

(65) Prior Publication Data

US 2012/0020437 A1 Jan. 26, 2012

(30) Foreign Application Priority Data

Jul. 21, 2010 (JP) .................................. 2010-164034

(51) Int. Cl.
*H04L 1/00* (2006.01)
*H04L 27/28* (2006.01)
*H04L 27/26* (2006.01)
*H04L 25/02* (2006.01)

(52) U.S. Cl.
CPC ........ *H04L 27/2602* (2013.01); *H04L 25/0204* (2013.01); *H04L 25/022* (2013.01); *H04L 25/0232* (2013.01); *H04L 27/2613* (2013.01)
USPC .......................................... 375/346; 375/260

(58) Field of Classification Search
CPC ............ H04L 25/0204; H04L 25/0232; H04L 25/022; H04L 27/2601; H04L 27/2602; H04L 27/2613
USPC ................... 375/260, 316, 340, 346; 370/480
See application file for complete search history.

(56) References Cited

U.S. PATENT DOCUMENTS

| 2006/0133529 A1* | 6/2006 | Lee et al. ....................... 375/260 |
| 2007/0230601 A1* | 10/2007 | Yim et al. ...................... 375/260 |
| 2007/0274406 A1* | 11/2007 | Adachi ......................... 375/260 |
| 2008/0075186 A1* | 3/2008 | Kawauchi et al. ............. 375/260 |
| 2008/0101490 A1* | 5/2008 | Kawauchi et al. ............. 375/260 |
| 2008/0304587 A1* | 12/2008 | Setoh et al. .................... 375/260 |
| 2009/0086854 A1 | 4/2009 | Yotsumoto |
| 2010/0074382 A1* | 3/2010 | Miyauchi et al. ............. 375/347 |
| 2010/0118694 A1 | 5/2010 | Shibata |

FOREIGN PATENT DOCUMENTS

| JP | 2005-252671 | 9/2005 |
| JP | 2007-318479 | 12/2007 |
| JP | 2009-89135 A | 4/2009 |
| WO | WO-2009/016688 | 2/2009 |

* cited by examiner

*Primary Examiner* — Betsy Deppe
(74) *Attorney, Agent, or Firm* — Fujitsu Patent Center

(57) ABSTRACT

An reception device includes: a fast-fourier-transform (FFT) circuit to FFT a first Orthogonal Frequency Division Multiplexing (OFDM) signal including a plurality of first symbols with a guard interval and a valid symbol using a plurality of FFT windows that includes different timings within a symbol length period; a propagation channel estimation circuit to extract pilot signals from the fast-fourier-transformed first OFDM signal, and estimate a plurality of propagation channel characteristics of the plurality of first symbols based on the pilot signals; and a propagation channel compensation circuit to obtain a propagation channel characteristic of a second symbol without a pilot signal based on the plurality of propagation channel characteristics and remove the propagation channel characteristic of the second symbol from a second OFDM signal obtained by fast-fourier-transforming the second symbol.

14 Claims, 14 Drawing Sheets

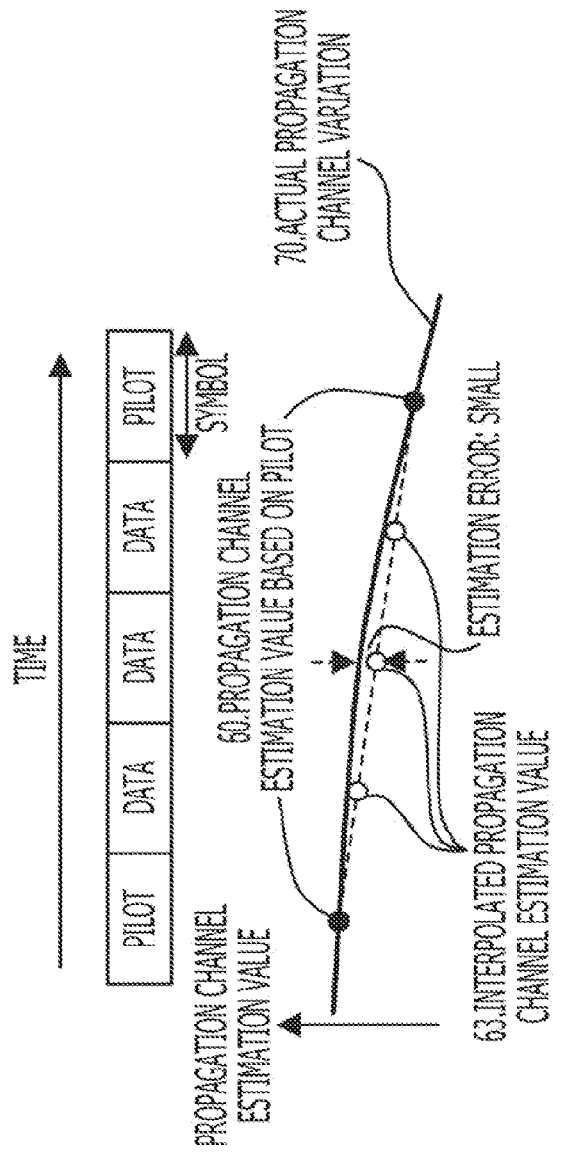
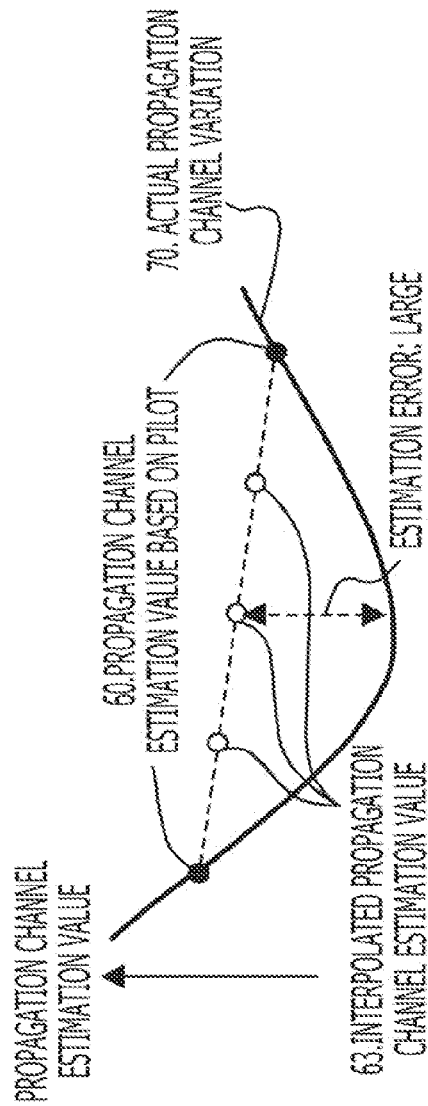
FIG. 5A
FIG. 5B

US 8,837,648 B2

OFDM COMMUNICATION RECEPTION DEVICE

CROSS-REFERENCE TO RELATED APPLICATIONS

This application claims the benefit of priority from Japanese Patent Application No. 2010-164034 filed on Jul. 21, 2010, the entire contents of which are incorporated herein by reference.

BACKGROUND

1. Field

Embodiments relate to an OFDM communication reception device.

2. Description of Related Art

In Orthogonal Frequency Division Multiplexing (OFDM) or Orthogonal Frequency Division Multiple Access (OFDMA), a plurality of frequencies having orthogonal relations with one another are divided into subcarriers and sent to a transmission medium.

An OFDM communication method may include an OFDM communication method or an OFDMA communication method. A reception device based on OFDM communication may include a reception device based on OFDM communication or a reception device based on OFDMA communication.

Related art is disclosed in Japanese Unexamined Patent Application Publication No. 2009-89135, WO 2009/016688, or the like.

SUMMARY

According to one aspect of the embodiments, a reception device includes: a fast-fourier-transform (FFT) circuit to FFT a first Orthogonal Frequency Division Multiplexing (OFDM) signal including a plurality of first symbols with a guard interval and a valid symbol using a plurality of FFT windows that includes different timings within a symbol length period; a propagation channel estimation circuit to extract pilot signals from the fast-fourier-transformed first OFDM signal, and estimate a plurality of propagation channel characteristics of the plurality of first symbols based on the pilot signals; and a propagation channel compensation circuit to obtain a propagation channel characteristic of a second symbol without a pilot signal based on the plurality of propagation channel characteristics and remove the propagation channel characteristic of the second symbol from a second OFDM signal obtained by fast-fourier-transforming the second symbol.

The object and advantages of the embodiments will be realized and attained by means at least of the features, elements, and combinations particularly pointed out in the appended claims.

It is to be understood that both the foregoing general description and the following detailed description are exemplary and explanatory and are not restrictive of the embodiments, as claimed.

BRIEF DESCRIPTION OF THE DRAWINGS

FIG. 5A and FIG. 5B illustrate an exemplary error of a propagation channel estimation value;

DESCRIPTION OF EMBODIMENTS

A transmission device based on OFDM communication inserts a pilot signal into an encoded transmission signal, modulates the transmission signal into a plurality of subcarriers, inverse-fast-fourier-transforms (IFFT process) the subcarriers to generate a temporal signal, and adds a guard interval to the temporal signal. In addition to this, the transmission device subjects the temporal signal to high-frequency wave process and sends the signal to a transmission medium. A reception device based on the OFDM communication subjects a reception signal to RF process, removes the guard interval, generates a signal in a frequency domain by fast-fourier-transforming (FFT process) the reception signal, and estimates a propagation channel characteristic such as fading occurring on a propagation channel or the like, based on the variations in the phase and the amplitude of the fast-fourier-transformed pilot signal. The reception device removes the effects of the variations in the phase and the amplitude of the propagation channel from the reception signal based on the estimated propagation channel characteristic, and decodes the reception signal.

The transmission device inverse-fast-fourier-transforms modulation signals of the plurality of subcarriers whose frequencies are different from one another, and transmits the modulation signals subjected to the IFFT conversion for each symbol. The transmission device inserts a pilot signal used for estimating the propagation channel characteristic. The pilot signal may be inserted every a certain number of subcarriers and every a certain number of symbols.

The reception device detects the phase and the amplitude of the pilot signal, and estimates the propagation channel characteristic based on differences between the phase or amplitude of the pilot signal in the reception signal and those of the pilot signal on the transmitting side. A propagation channel characteristic in a symbol into which no pilot signal is inserted may be obtained by interpolating a propagation channel estimation value estimated in a symbol into which the pilot signal is inserted. By performing an interpolation operation based on the propagation channel characteristic estimated in a subcarrier into which the pilot signal is inserted, a propagation channel characteristic in a subcarrier into which no pilot signal is inserted may be obtained.

Figure 1:
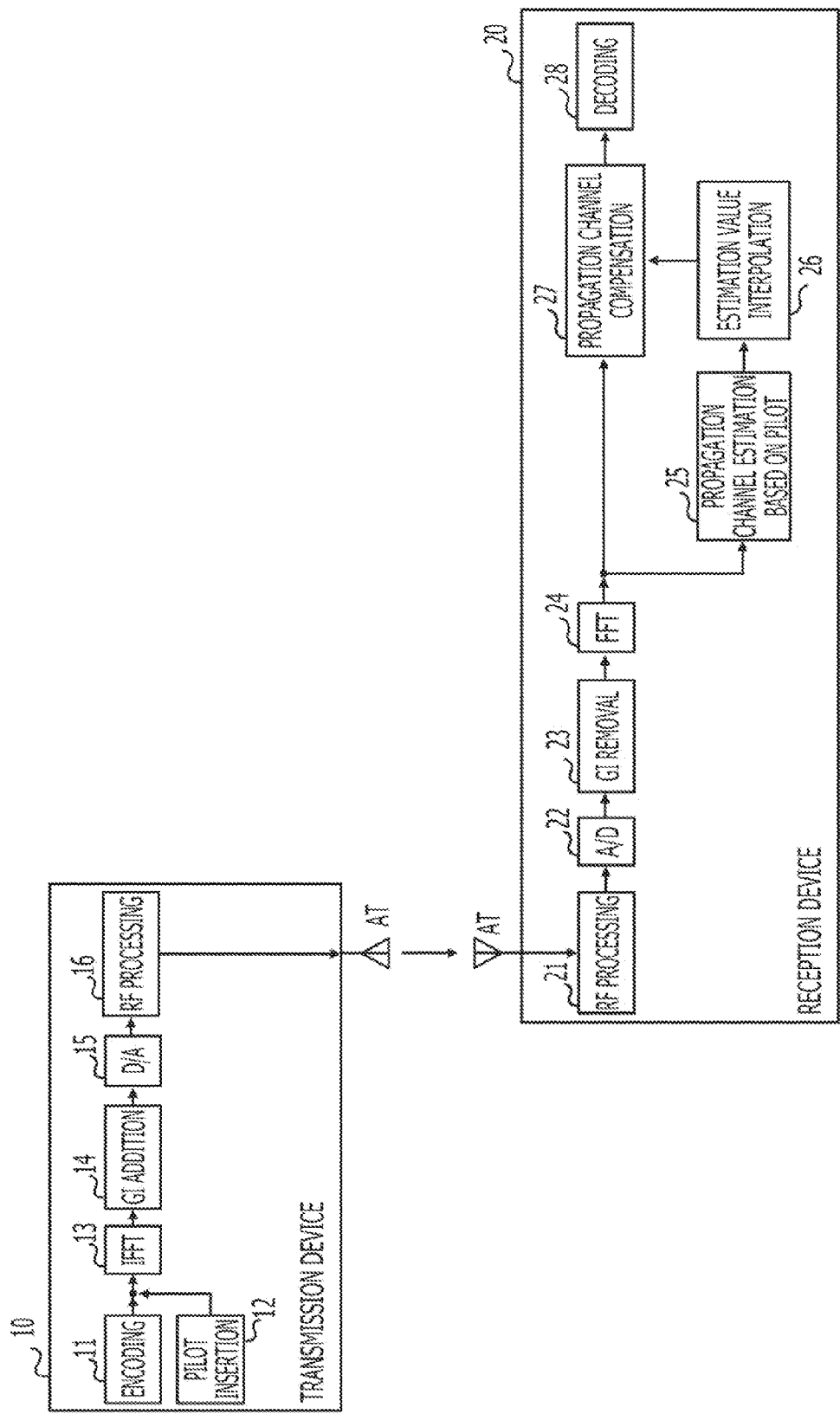
FIG. 1 illustrates an exemplary transmission device and an exemplary reception device.

FIG. 1 illustrates an exemplary transmission device and an exemplary reception device. An OFDM communication method or an OFDMA communication method may be adopted for the transmission device and the reception device, illustrated in FIG. 1. A transmission device 10 includes an encoding circuit 11 for encoding transmission data, a pilot insertion circuit 12 for inserting a pilot signal into an encoded data sequence, an IFFT processing circuit 13, a GI addition circuit 14 for adding a guard interval to a fast-fourier-transformed valid symbol in a temporal domain, a D/A conversion circuit 15 for digital-analog converting an output from the GI addition circuit 14, and an RF processing circuit 16 for up-converting an analog signal to a high-frequency signal and performing orthogonal modulation on the analog signal. The pilot signal may be known.

The reception device 20 performs reverse process to that of the transmission device 10. The reception circuit 20 includes an RF processing circuit 21 for down-converting a reception signal and performing orthogonal demodulation on the down-converted reception signal, an A/D conversion circuit 22, a GI removal circuit 23 for removing the guard interval from the OFDM signal in the temporal domain, an FFT processing circuit 24, and a decoding circuit 28. The reception device 20 includes a propagation channel estimation circuit 25 for extracting the pilot signal from a symbol into which the pilot signal is inserted and estimating a propagation channel characteristic based on the phase and the amplitude on the pilot signal and the like, an estimation value interpolation circuit 26 for estimating the propagation channel characteristic of a symbol into which no pilot signal is inserted by performing an interpolation operation based on the propagation channel characteristic, and a propagation channel compensation circuit 27 for removing the propagation channel characteristic from individual signals of the symbols based on the propagation channel characteristic.

Figure 2:
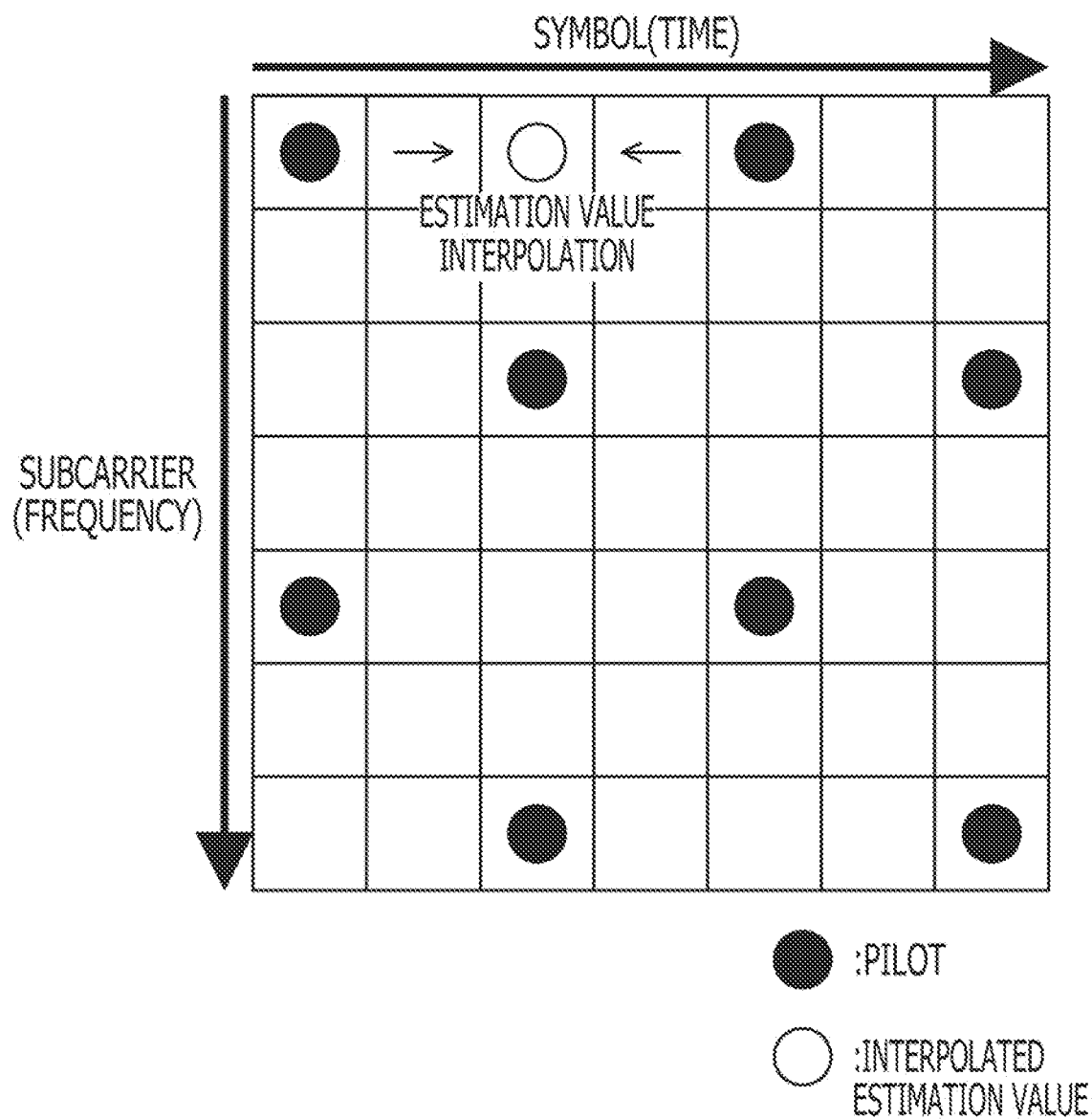
FIG. 2 illustrates an exemplary relationship between a subcarrier and a symbol.

FIG. 2 illustrates an exemplary relationship between a subcarrier and a symbol. The subcarrier and the symbol illustrated in FIG. 2 may be a subcarrier and a symbol based on the OFDM or OFDMA communication method, respectively. A plurality of symbols are arranged on a temporal axis, and a plurality of subcarriers are arranged on a frequency axis. Each of the symbols is subjected to multicarrier transmission using a plurality of subcarriers having orthogonal relations with one another. In FIG. 2, a black circle indicates the pilot signal, and a white circle indicates a propagation channel estimation value obtained based on the interpolation operation.

The pilot signal may be intermittently allocated to continuous symbols so as to ensure a data transmission amount. The pilot signal may be intermittently allocated to continuous subcarriers. When a transmission path environment fluctuates owing to multipath fading with the elapse of time, the propagation channel characteristics of symbols continuous on the temporal axis may also fluctuate. When the transmission device or the reception device is a mobile device, the Doppler effect varies with the elapse of time, and the propagation channel characteristics of individual symbols may fluctuate. Since interference between a main wave and a delayed wave based on the multipath fading has frequency dependence in subcarriers which is continuous on the frequency axis, the propagation channel characteristics thereof may vary.

As illustrated in FIG. 2, the propagation channel characteristic (white circle) of a symbol into which no pilot signal is inserted may be estimated by performing an interpolation operation based on a propagation channel characteristic estimated based on pilot signals in a plurality of adjacent symbols into which pilot signals (black circles) are inserted. A propagation channel characteristic in a subcarrier into which no pilot signal is inserted may also be estimated in substantially the same or similar way.

Figure 3:
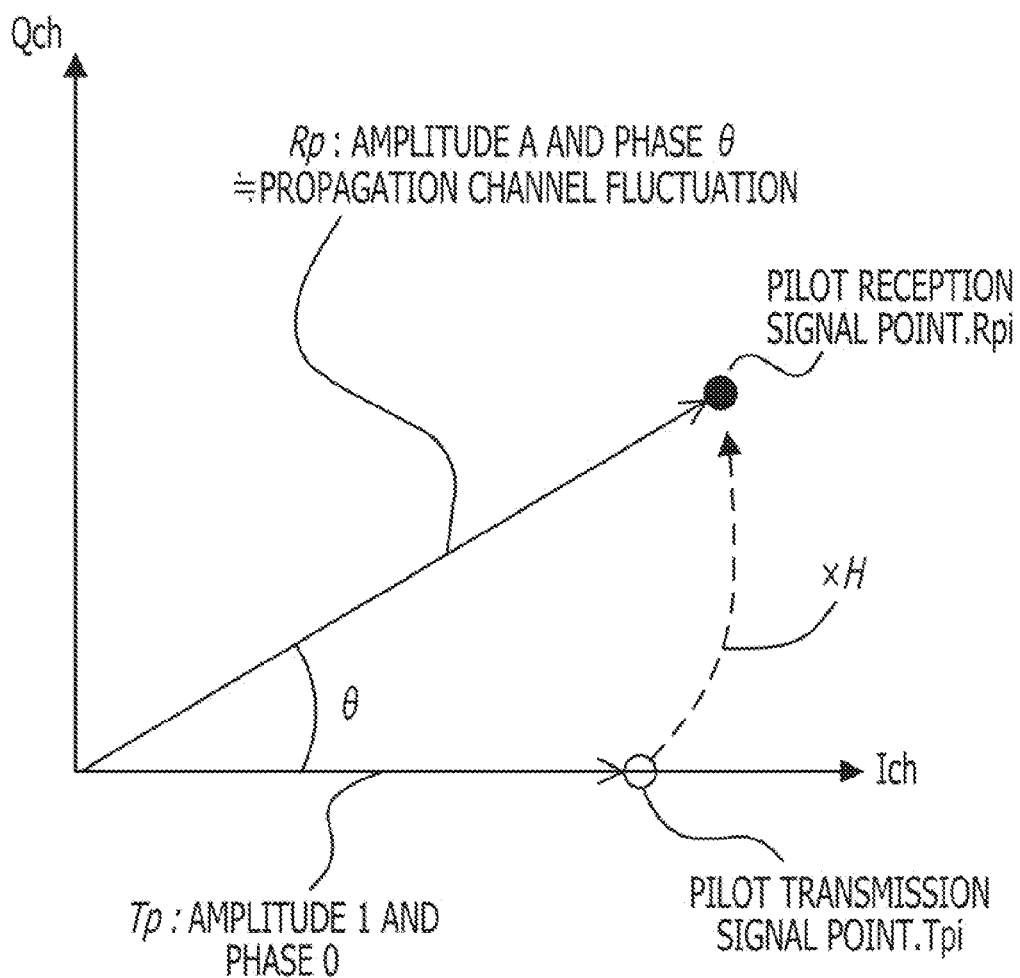
FIG. 3 illustrates an exemplary propagation channel estimation.

FIG. 3 illustrates an exemplary propagation channel estimation. In FIG. 3, a propagation channel may be estimated based on a pilot signal. In FIG. 3, a pilot transmission signal point Tpi and a pilot reception signal point Rpi are indicated in a constellation based on an I channel and a Q channel. For example, the amplitude and the phase of a pilot signal Tp on a transmitting side may be "1" and "0 degree", respectively, and the amplitude and the phase of a pilot signal Rp on a receiving side may be A and θ, respectively. The pilot transmission signal Tp may change into the pilot reception signal Rp based on a propagation channel characteristic H. The amplitude A and the phase θ that fluctuate based on the propagation channel characteristic H may correspond to the estimation values of a propagation channel characteristic which is estimated based on the pilot signal. Since Rp=H×Tp and Tp=(1, 0), it may be assumed that Rp≈H.

Figure 4:
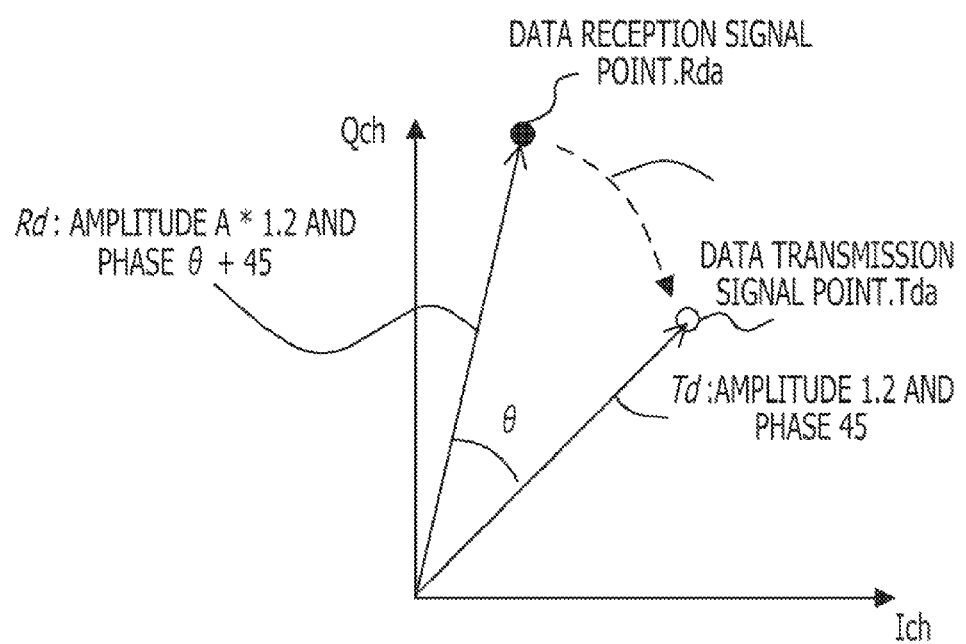
FIG. 4 illustrates an exemplary propagation channel compensation.

FIG. 4 illustrates an exemplary propagation channel compensation. The propagation channel compensation may be performed using a propagation channel estimation value based on the pilot signal. When the propagation channel characteristic H illustrated in FIG. 3 is set, a data signal point Tda on the transmitting side shifts to a data signal point Rda where an amplitude on a receiving side changes into an amplitude A times and a phase on the receiving side changes to θ. For example, when the amplitude and phase of a data transmission signal Td are "1.2" and "45 degrees", respectively, a data reception signal Rd may correspond to a point whose amplitude and phase are "A*1.2" and "45 degrees+θ" respectively. In order to remove the propagation channel characteristic H≈Rp, the following calculations may be performed.

*Rd=H×Td* and *Td=Rd/H=Rd/Rp*

Since the pilot signal is known, the amplitude and phase of the pilot reception signal Rp are detected, and hence the propagation channel characteristic H may be estimated based on Rp. Propagation channel characteristics in individual symbols are estimated using an interpolation operation based on the estimated propagation channel estimation value Rp, and propagation channel compensation for individual symbols is performed.

FIG. 5A and FIG. 5B illustrate an exemplary error of a propagation channel estimation value. In FIG. 5A and FIG. 5B, five symbols such as "Pilot", "Data", "Data", "Data", and "Pilot" are arranged on the temporal axis. The pilot signal "Pilot" is inserted into symbols "Pilot" at both ends, and the data "Data" is inserted into symbols "Data" and no pilot signal is inserted thereinto. As illustrated in FIG. 5A, when the propagation channel slowly varies, a propagation channel characteristic 70 indicated by a solid line moderately varies with the elapse of time. Errors between the propagation channel estimation values (white circles) 63 of three data symbols, which are obtained by linearly interpolating propagation channel estimation values (black circles) 60 based on pilot signals at both ends, and a propagation channel variation 70 may be small.

As illustrated in FIG. 5B, when the propagation channel rapidly varies, the propagation channel characteristic 70 indicated by a solid line greatly varies. Errors between the propagation channel estimation values (white circles) 63 of three data symbols, which are obtained by linearly interpolating propagation channel estimation values (black circles) 60 based on pilot signals at both ends, and a propagation channel variation 70 may be large.

A quadratic interpolation operation may be performed in response to an increase of a number of propagation channel estimation values based on pilot signals. The quadratic interpolation operation may be complex. When the propagation channel greatly varies, the limitation of estimation may occur.

Figure 6:
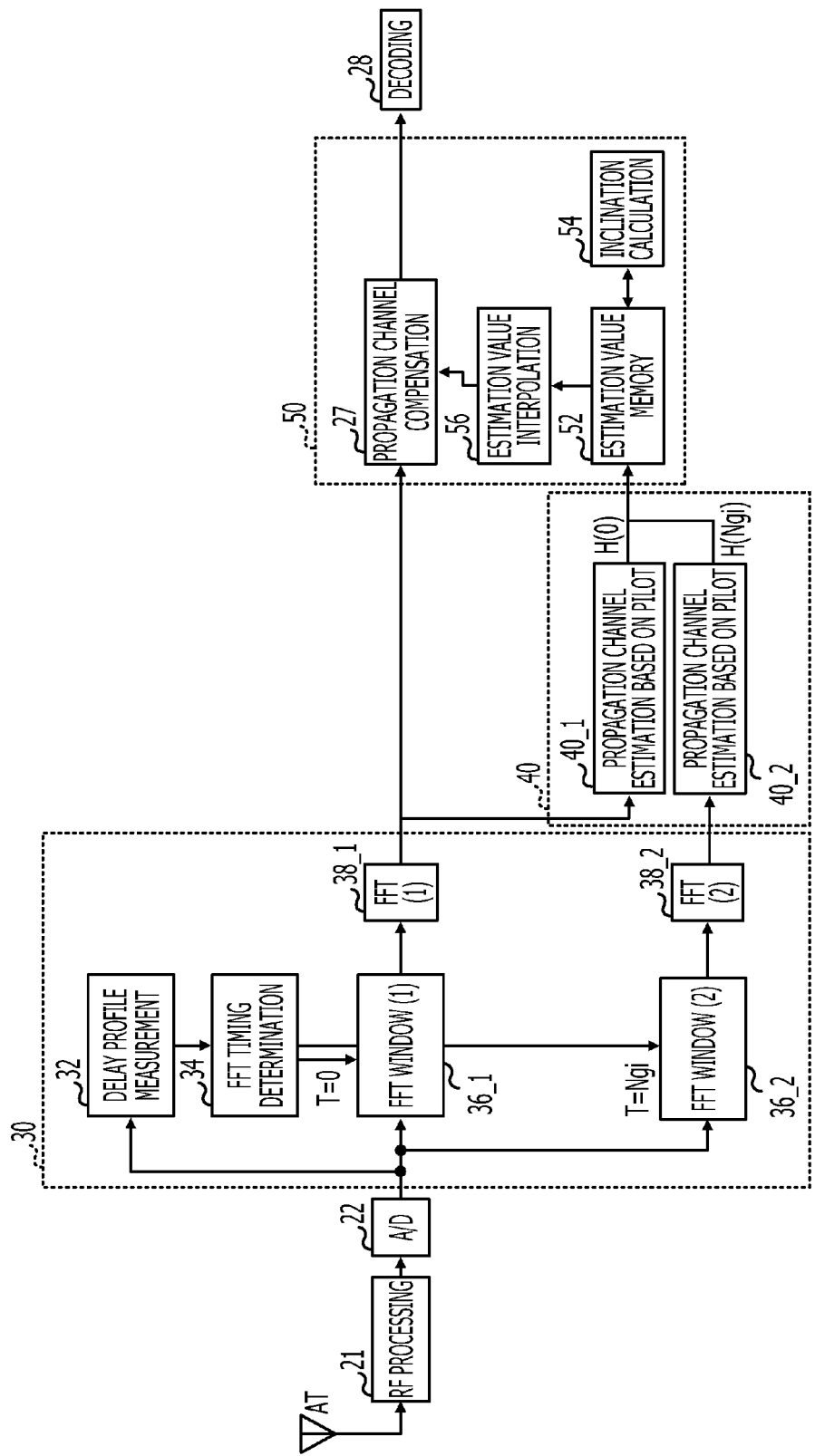
FIG. 6 illustrates an exemplary reception device.

FIG. 6 illustrates an exemplary reception device. An OFDM communication method or an OFDMA communication method may be adopted for a reception device illustrated in FIG. 6. The reception device includes an RF processing circuit 21 for down-converting a reception signal received by an antenna AT and performing orthogonal demodulation on the reception signal, and an A/D conversion circuit 22. A digital signal subjected to A/D conversion may be an OFDM signal in the temporal domain. The reception device includes an FFT circuit 30 for performing FFT process on the OFDM signal including a guard interval and a valid symbol for a first symbol into which the pilot signal is inserted, using a plurality of FFT windows that are located in a symbol length period and have different timings.

A propagation channel estimation circuit 40 in the reception device individually extracts a plurality of pilot signals of OFDM signals subjected to FFT process based on the plurality of FFT windows, and estimates a plurality of propagation channel characteristics in the first symbol based on the pilot signals by using a plurality of estimation units, for example, two estimation units 40_1 and 40_2. For example, a plurality of propagation channel characteristics may be obtained based on one pilot signal.

A propagation channel compensation circuit 50 includes a propagation channel compensation circuit 27, an estimation value interpolation processing circuit 56, an estimation value memory 52 and an inclination calculation part 54. The propagation channel compensation circuit 50 in the reception device obtains the propagation channel estimation value of a second symbol into which no pilot signal is inserted based on inclinations indicating the variations of the plurality of propagation channel characteristics of the first symbol, for example, the differential values of the variations, and removes the propagation channel estimation value from an OFDM signal in the fast-fourier-transformed second symbol. A signal subjected to propagation channel compensation may be decoded by the decoding circuit 28.

The FFT circuit 30 includes a delay profile measurement circuit 32 for measuring the delay profile of an OFDM signal including a guard interval and a valid symbol for the first symbol, an FFT timing determination circuit 34 for determining FFT timing in response to the measurement result, and FFT window processing circuits 36_1 and 36_2 for extracting an OFDM signal to be fast-fourier-transformed with determined FFT timings T=0 and T=Ngi as the starting positions of FFT windows. The OFDM signal extracted by the FFT window processing circuits 36_1 and 36_2 is fast-fourier-transformed (FFT process) performed by FFT processing circuits 38_1 and 38_2.

Figure 7:
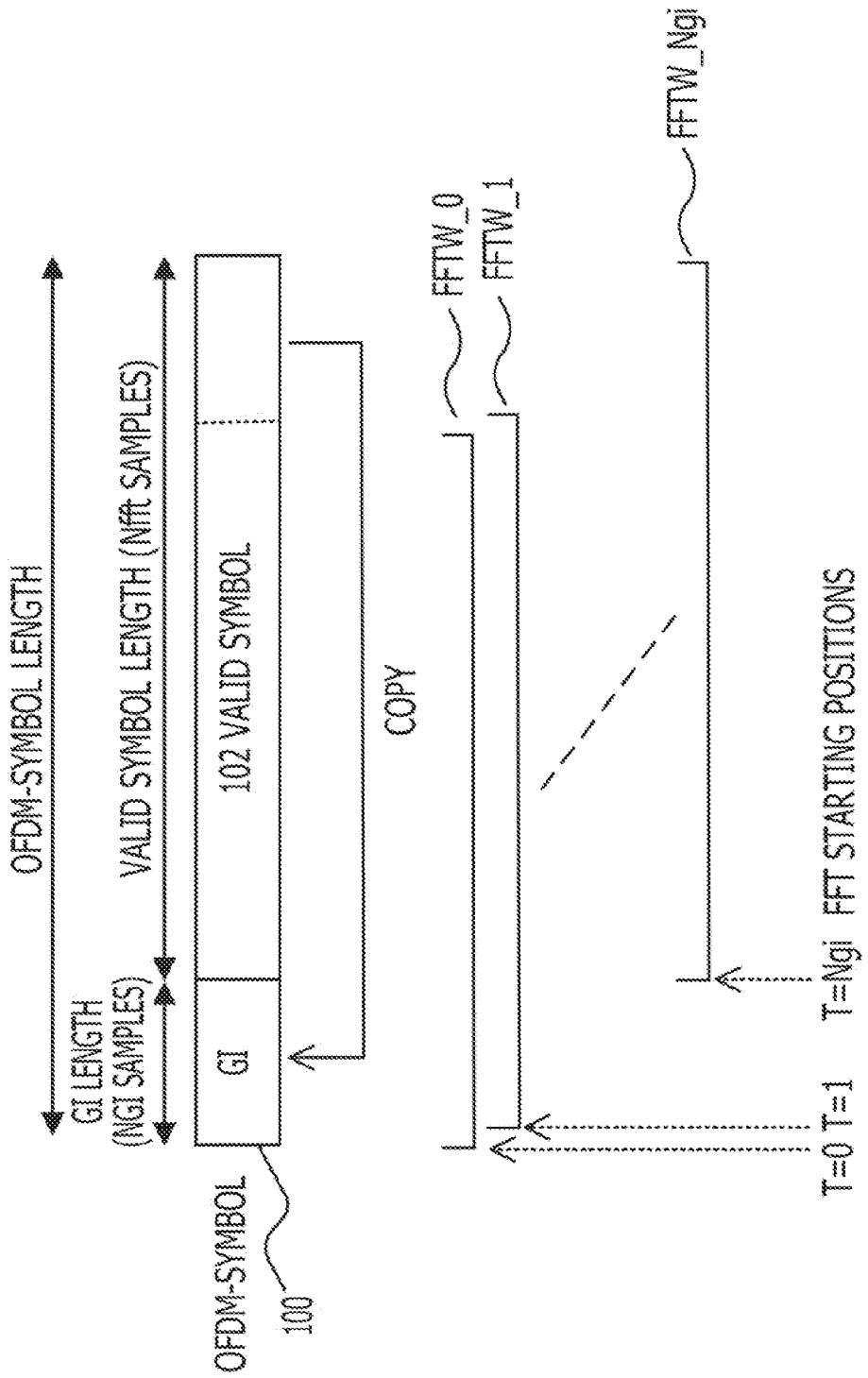
FIG. 7 illustrates an exemplary FFT timing.

FIG. 7 illustrates an exemplary FFT timing. The FFT timing determination circuit 34 may determine the FFT timing. "100" illustrated in FIG. 7 may be an OFDM symbol signal, and indicates an OFDM signal in which a guard interval GI is added to the leading portion of a valid symbol 102. A valid symbol length includes the guard interval GI and the valid symbol 102. For example, the guard interval GI may include digital signals at Ngi sampling points, and the valid symbol 102 may include digital signals at Nfft sampling points. The OFDM symbol 100 may correspond to digital signals at Ngi+Nfft sampling points.

A copy of the rear-end portion of the valid symbol 102 may correspond to the guard interval GI. Any portion extracted from the OFDM symbol length may be substantially the same OFDM signal. Therefore, in the FFT window during which the FFT process is performed, even if any one of Ngi sample points ranging from the sample point T=0 to the sample point T=Ngi is selected as staring timing, substantially the same OFDM signal is extracted. When the propagation channel characteristic varies, the propagation channel characteristic may be different if the timing of the FFT window is different. For example, a plurality of OFDM signals are extracted in one of FFT windows FFTW_0 to FFTW_Ngi, the OFDM signal are fast-fourier-transformed, and a pilot signal having the effect of the propagation channel characteristic of the timing is acquired.

For example, an FFT window FFTW_0 whose starting timing is a sample point T=0 to which FFT starting timing is shifted farthest on a temporal axis during a symbol length period and an FFT window FFTW_Ngi whose starting timing is a sample point T=Ngi may be selected. OFDM signals in both the FFT windows FFTW_0 and FFTW_Ngi may be fast-fourier-transformed. Propagation channel characteristics at two timings distantly positioned from each other on the temporal axis may be acquired based on pilot signals extracted from both FFT window OFDM signals subjected to the FFT process.

In the FFT circuit 30 illustrated in FIG. 6, the delay profile measurement circuit 32 may detect the timing of the guard interval GI based on a GI correlation operation for measuring correlation between the guard interval GI and a portion corresponding to the guard interval GI shifted by a valid symbol length (the length of the valid symbol 102) within the OFDM symbol 100. For example, when there is no preceding wave and no delayed wave, the portion shifted by the valid symbol length may correspond to the signal of the copy source of the guard interval GI. Therefore, a correlation value may become large at the position of the guard interval GI.

The timing of the OFDM symbol 100, for example, the position of the sampling point T=0, may be detected based on the delay profile measurement. The FFT timing determination circuit 34 determines the FFT windows FFTW_0 and FFTW_Ngi whose starting times are the sampling points T=0 and T=Ngi, illustrated in FIG. 7, respectively.

The FFT window processing units 36_1 and 36_2 extract OFDM signals at the sampling points of the FFT windows FFTW_0 and FFTW_Ngi, and output the OFDM signals to the FFT processing circuits 38_1 and 38_2 in a subsequent stage. The FFT processing units 38_1 and 38_2 individually fast-Fourier-transform (FFT process) the OFDM signals.

Figure 8:
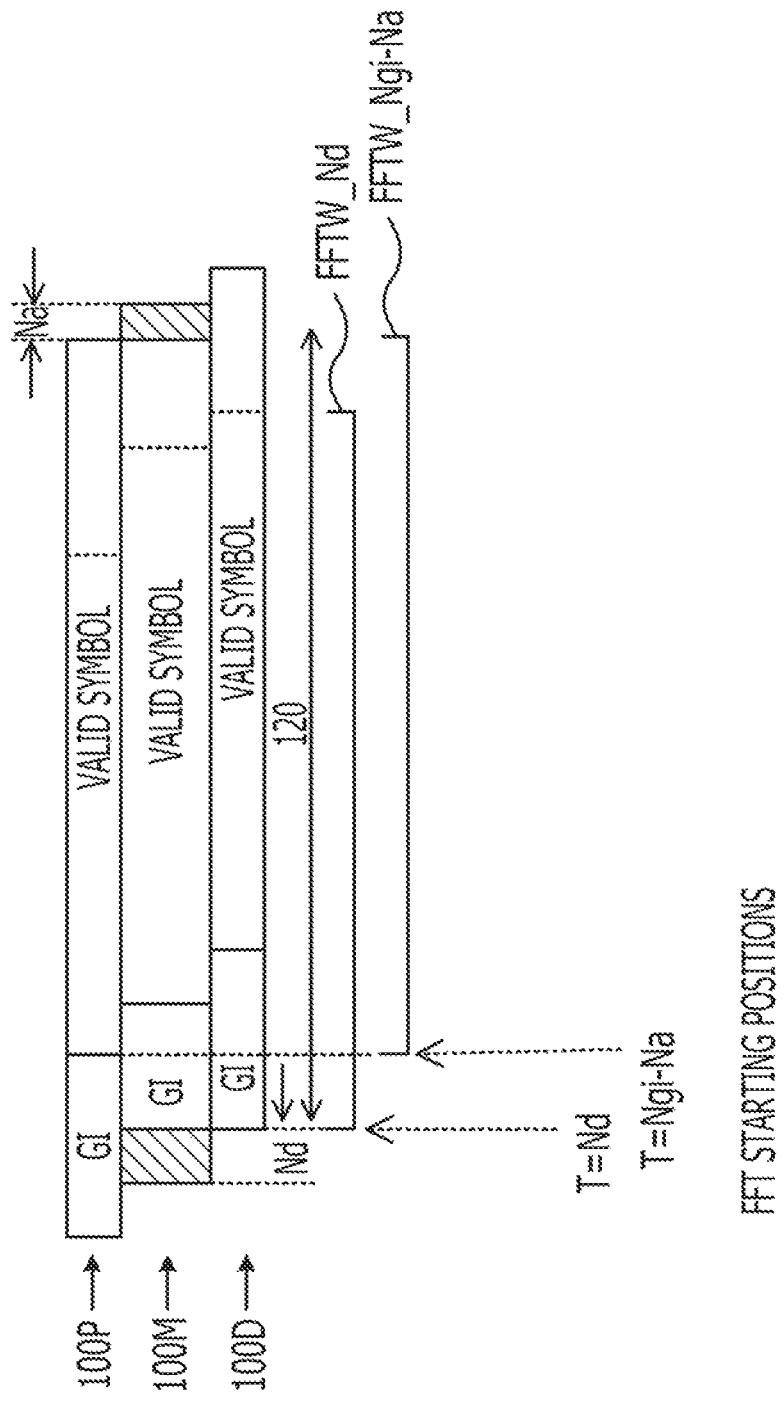
FIG. 8 illustrates an exemplary FFT timing.

FIG. 8 illustrates an exemplary FFT timing. The FFT timing determination circuit 34 may determine the FFT timing. In an OFDM symbol 100 illustrated in FIG. 8, a preceding wave 100P and a delayed wave 100D may occur within a guard interval GI length in addition to a main wave 100M. The preceding wave 100P may occur at a timing Na sampling points earlier than the main wave 100M. The delayed wave 100D may occur at a timing Nd sampling points behind the main wave 100M.

OFDM signals may be extracted in FFT windows FFTW_Nd and FFTW_Ngi−Na, which have different timings with each other, at sampling points T=Nd to T=Ngi+Nfft−1−Na within a period 120 in which the preceding wave 100P, the main wave 100M, and the delayed wave 100D overlap with one another. For example, the starting timing of FFT may be one of sampling points T=Nd to T=Ngi−Na. No intersymbol interference (ISI) due to a precedent symbol or a subsequent symbol may occur in the overlapping period 120. Since intersymbol interference occurs on the outside of the overlapping period 120, the accuracy of the estimation value of a propagation channel characteristic may be reduced. A differential value corresponding to the accurate variation of the propagation channel characteristic may be obtained at a farthest timing on the temporal axis within the overlapping period 120.

The delay profile measurement circuit 32 may detect the timing of the GI of each of the preceding wave 100P, the main wave 100M, and the delayed wave 100D based on the above-mentioned GI correlation. In response to the measurement result of the delay profile measurement circuit, the FFT timing determination circuit 34 extracts OFDM signals in the FFT windows FFTW_Nd and FFTW_Ngi−Na, and outputs the OFDM signals to the FFT processing circuits.

When the main wave and the preceding wave are detected, an FFT window having the earliest timing and an FFT window having the latest timing are set within an overlapping period in which the main wave and the preceding wave overlap with each other. When the main wave and the delayed wave are detected, an FFT window having the earliest timing and an FFT window having the latest timing are set within an overlapping period in which the main wave and the delayed wave overlap with each other.

In FIG. 6, two sets of FFT window processing circuits, two sets of FFT processing circuits, and two sets of propagation channel estimation circuits are provided, and two propagation channel estimation values may be obtained from one pilot signal. Three sets of FFT window processing circuits, three sets of FFT processing circuits, and three sets of propagation channel estimation circuits may be provided. For example, more than two FFT windows FFTW are selected in FIGS. 7 and 8. The FFT timing determination circuit 34 may determine the timings of more than two FFT windows. More than two propagation channel estimation values may be obtained from one pilot signal.

Figure 9:
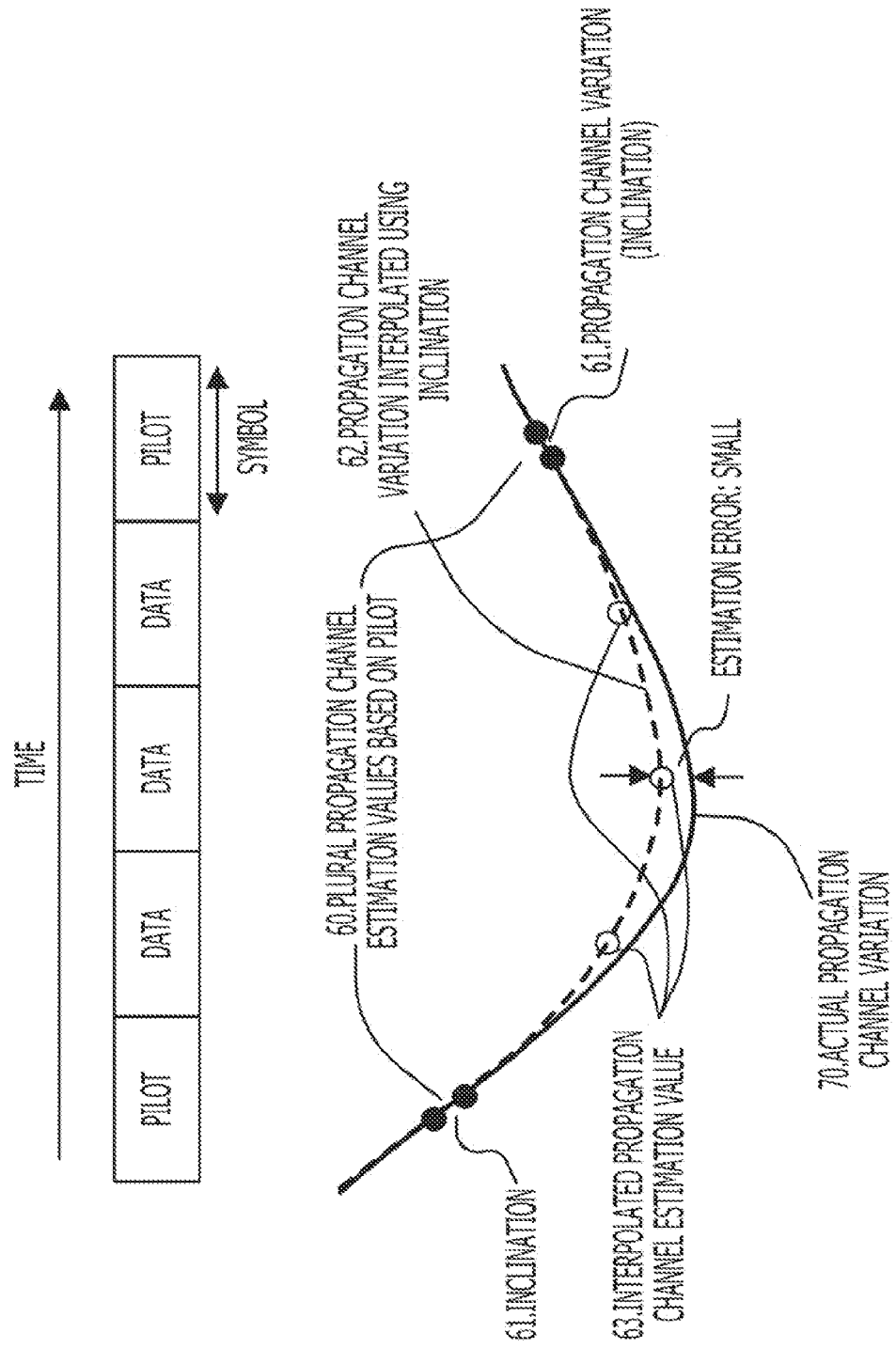
FIG. 9 illustrates an exemplary propagation channel estimation.

FIG. 9 illustrates an exemplary propagation channel estimation. The reception device fast-fourier-transforms a symbol into which a pilot signal is inserted in a plurality of FFT windows having different timings with one another, extracts the pilot signal, and estimates a propagation channel characteristic based on the pilot signal. Since the OFDM symbol includes a valid symbol and a guard interval, a plurality of propagation channel estimation values which are temporally different from one another may be obtained from one pilot signal.

Two propagation channel estimation values (black circles) 60 are acquired in a symbol into which a pilot signal is inserted, illustrated in FIG. 9. The variation of a propagation channel characteristic, for example, an inclination (the differential value of the propagation channel characteristic) 61, may be obtained based on the two propagation channel estimation values 60. Using the variations of propagation channel characteristics in the symbols of pilot signals on both sides, for example, inclinations 61, the variation 62 of a propagation channel estimation value indicated by a solid line, which is similar to the variation 70 of a propagation channel indicated by a dashed line, is obtained. Therefore, accurate propagation channel estimation values (white circles) 63 may be obtained based on the variation 62.

Figure 10:
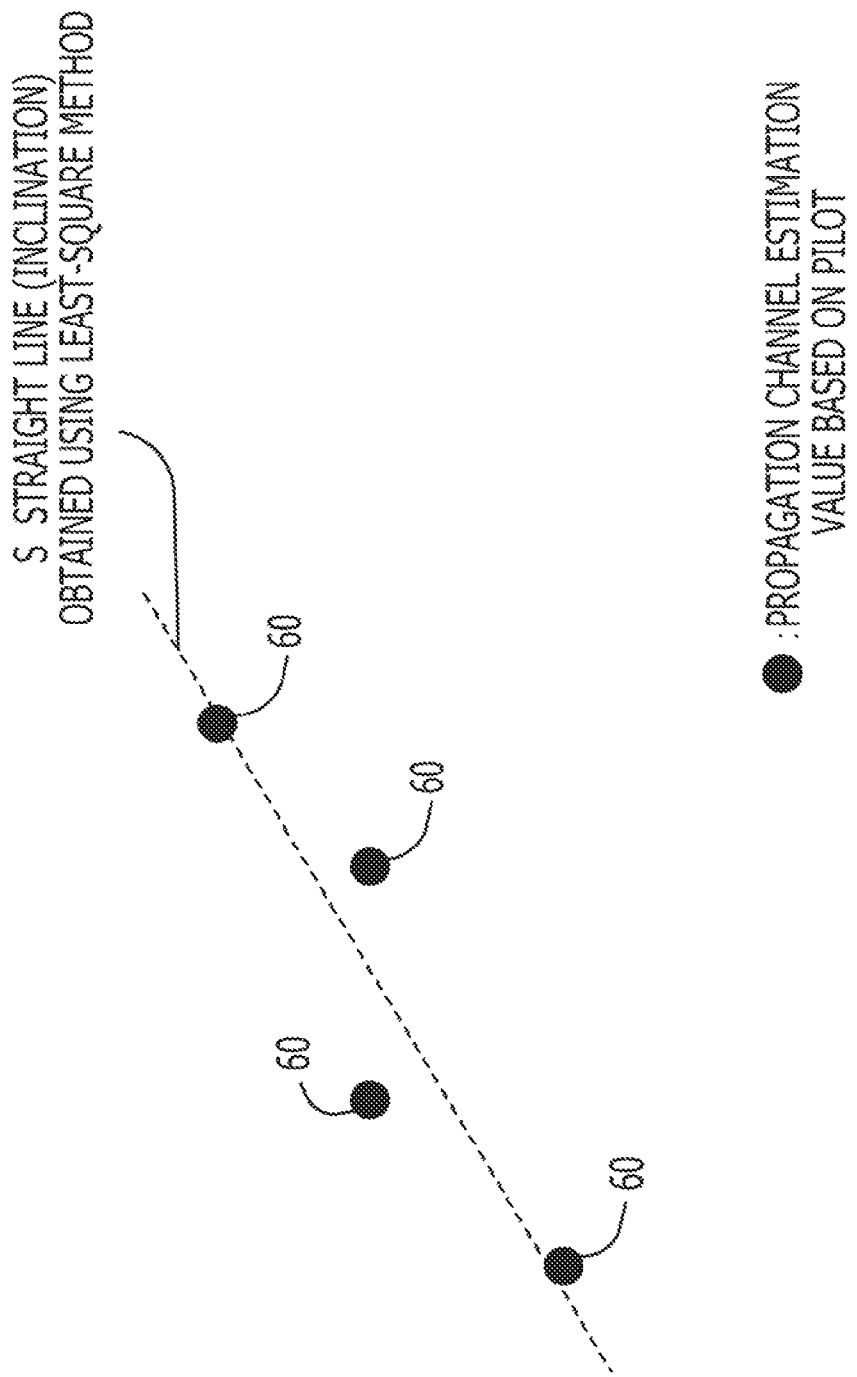
FIG. 10 illustrates an exemplary variation of a propagation channel.

FIG. 10 illustrates an exemplary variation of the propagation channel. A straight line S whose inclination indicates the variation of the propagation channel may be obtained based on a plurality of propagation channel estimation values. As illustrated in FIG. 9, when two propagation channel estimation values are obtained from a symbol including a pilot signal, a straight line coupling two propagation channel estimation values may have an inclination indicating the variation of the propagation channel, for example, a differential value.

When more than two propagation channel estimation values are obtained based on a symbol including a pilot signal, a straight line S having the inclination of the variation of a propagation channel estimation value may be obtained based on more than two propagation channel estimation values on (black circles) 60, using a least-square method, as illustrated in FIG. 10. A noise component included in the propagation channel estimation value may be removed from the inclination.

An interpolation operation for the propagation channel estimation value of a symbol into which no pilot signal is inserted may be performed based on the inclination of the propagation channel estimation value. For example, an intersection point between a straight line having a detected inclination and the time of a symbol into which no pilot signal is inserted may be set for the propagation channel estimation value. The inclinations of straight lines adjacent to each other may be converted so as to approach each other. A quadratic function is obtained based on an inclination and a time, and hence an intersection point between the quadratic function and the time of a symbol into which no pilot signal is inserted may be set for the propagation channel estimation value. A spline function is obtained based on an inclination and a time, and hence an intersection point between the spline function and the time of a symbol into which no pilot signal is inserted may be set for the propagation channel estimation value.

Figure 11:
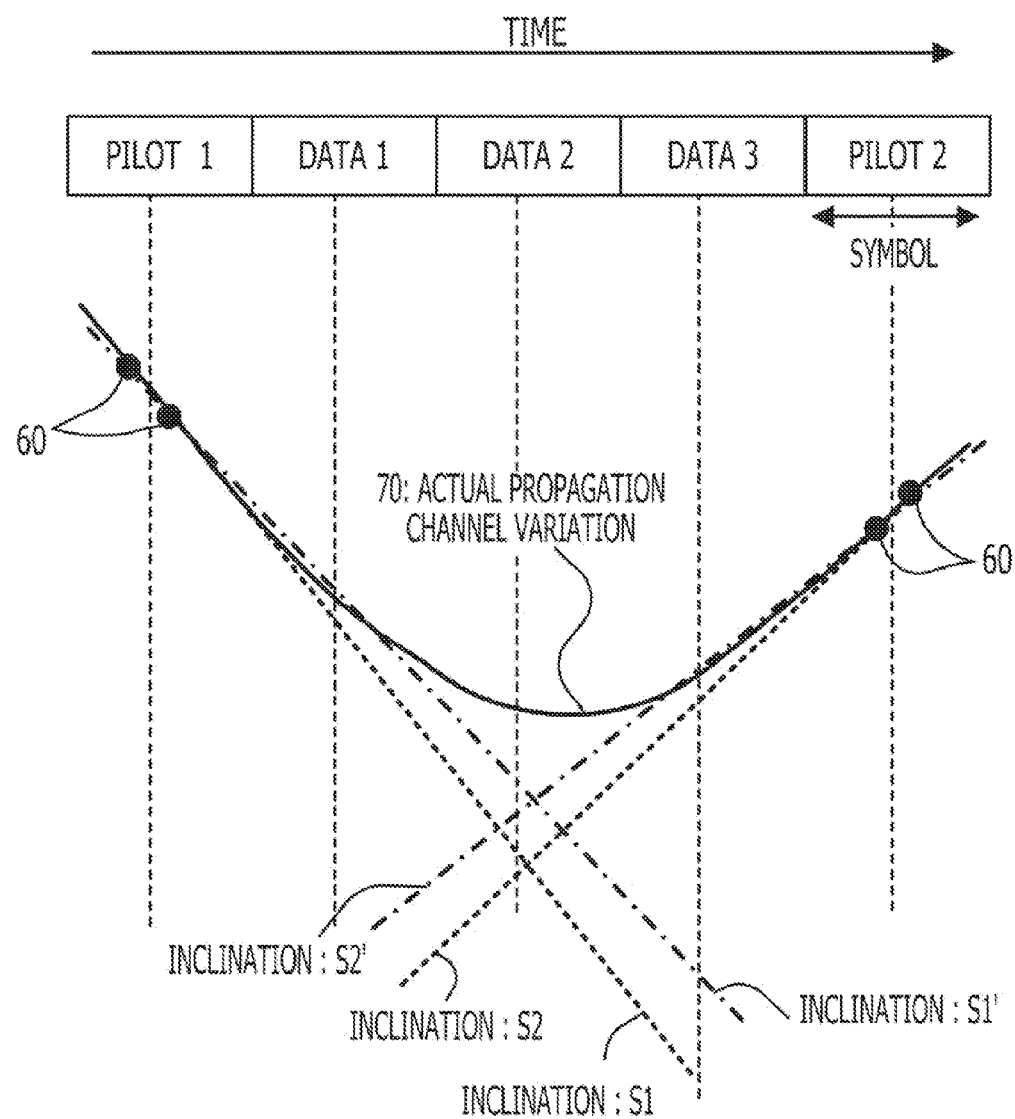
FIG. 11 illustrates an exemplary interpolation operation.
Figure 12:
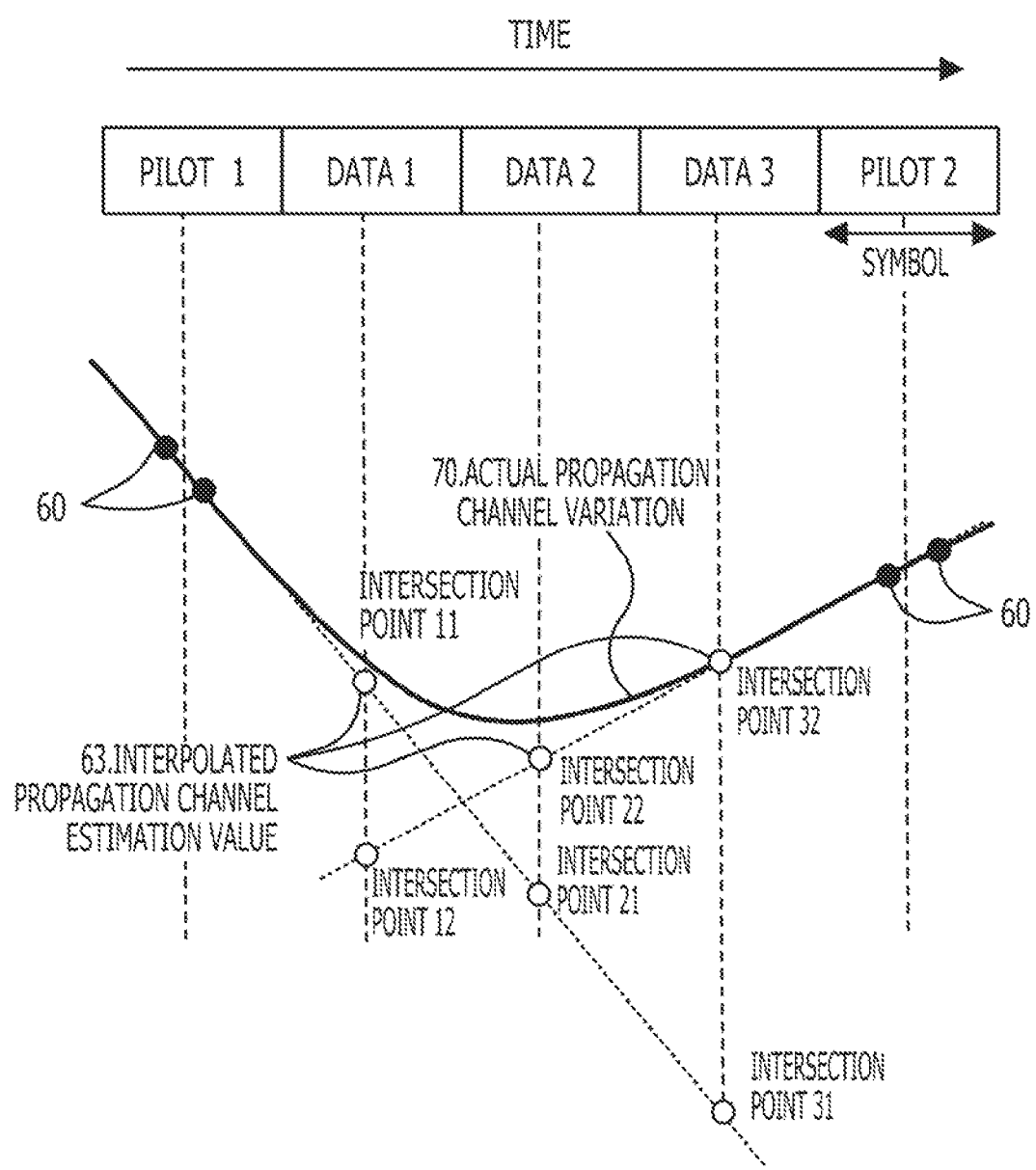
FIG. 12 illustrates an exemplary intersection point.

FIG. 11 illustrates an exemplary interpolation operation. FIG. 12 illustrates an exemplary intersection point. The interpolation operation may be performed on a first propagation channel estimation value. In FIG. 11, each of two pilot signals may obtain two propagation channel estimation values 60. Inclinations S1 and S2, each of which couples two propagation channel estimation values 60, may be different from a propagation channel variation 70. The inclinations of straight lines each of which couples two propagation channel estimation values 60, for example, differential values S1 and S2, are converted so as to approach each other, and hence new inclinations, for example, differential values S1' and S2' may be obtained. The inclinations S1' and S2' after the conversion may have variation characteristics similar to the propagation channel variation 70.

For example, in FIG. 11, an intersection point between each of the straight lines whose inclinations are S1 and S1', respectively, and each of the center times of symbols (Data1, 2, and 3) into which no pilot signal is inserted and an intersection point between each of the straight lines whose inclinations are S2 and S2', respectively, and each of the center times of symbols (Data1, 2, and 3) into which no pilot signal is inserted may be obtained. Intersection points illustrated in FIG. 12 may be the obtained intersection points. The value of an intersection point 11 located nearer the propagation channel estimation values 60 may be determined as a propagation channel estimation value based on the interpolation operation, from among the intersection point 11 and an intersection point 12 at the center time of the symbol Data1. The value of an intersection point 22 located nearer the propagation channel estimation values 60 may be determined as a propagation channel estimation value, from among the intersection point 22 and an intersection point 21 at the center time of the symbol Data2. Also in the symbol Data3, an intersection point 32 may be determined as a propagation channel estimation value, from among the intersection point 32 and an intersection point 31.

In the operation in which the inclinations S1' and S2' after the conversion are calculated from the inclinations S1 and S2 illustrated in FIG. 11, the inclinations S1 and S2 are converted so that the inclination of the propagation channel estimation value of a symbol including a pilot signal and the inclination of the propagation channel estimation value of an adjacent symbol approaches each other. Hereinafter, the operation illustrated in FIG. 11 will be described.

In a case in which S1×S2≤0 (when the signs of the inclinations of two straight lines are different from each other), $S1'=S1\times\alpha$ and $S2'=S2\times\beta$.

In a case in which S1×S2>0 (when the signs of the inclinations of two straight lines are the same):
when |S1|<|S2|, S1'=S1/α and S2'=S2×β;
when |S1|>|S2|, S1'=S1×α and S2'=S2/β; and
when |S1|=|S2|, S1'=S1 and S2'=S2.

It is assumed that α<1 and β<1.

While the inclinations obtained based on the propagation channel estimation values 60 are not converted as illustrated in FIG. 11, the value of an intersection point between each of the straight lines having inclinations and each of the center times of the symbols into which no pilot signal is inserted, as illustrated in FIG. 12, may be set for the interpolated propagation channel estimation value.

Figure 13:
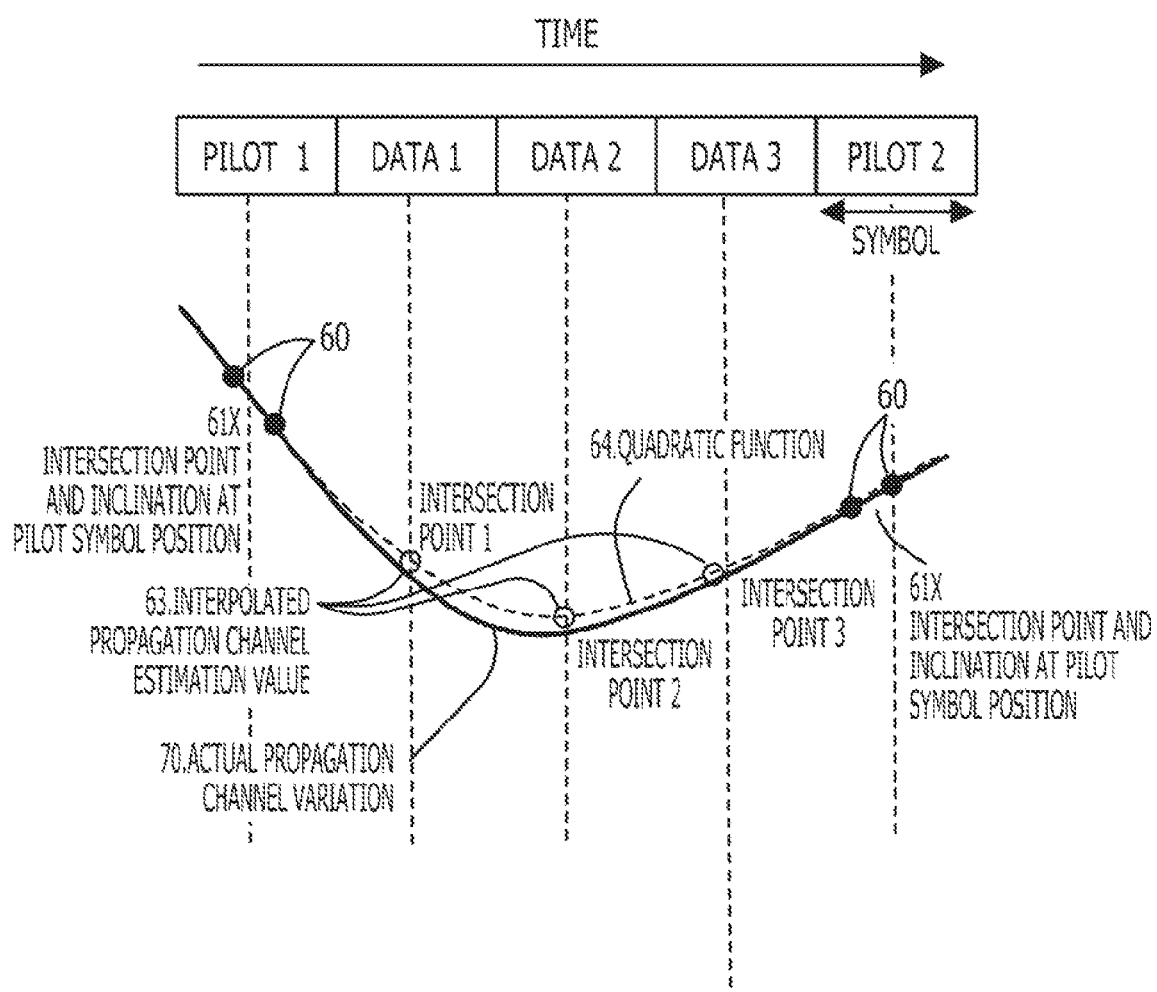
FIG. 13 illustrates an exemplary interpolation operation.

FIG. 13 illustrates an exemplary interpolation operation. The interpolation operation illustrated in FIG. 13 may be an interpolation operation for second propagation channel estimation. In FIG. 13, each of two pilot signals may obtain two propagation channel estimation values 60. An inclination may be obtained based on the two propagation channel estimation values 60, and a quadratic function 64 may be obtained based on intersection points 61X. The solution of the quadratic function 64 may be obtained based on inclinations at two points and the intersection points 61X. The propagation channel variation 70 may be approximated by the quadratic function 64.

Intersection points between the quadratic function 64 and the center times of symbols Data1, 2, and 3 into which no pilot signal is inserted may be obtained as interpolated propagation channel estimation values 63. Since the function of a propagation channel variation is derived based on a variation and an inclination, which are calculated from a pair of propagation channel estimation values 60, the highly accurate propagation channel estimation values 63 may be obtained.

A spline function is obtained in place of the quadratic function 64, and intersection points between the spline function and the center times of the symbols into which no pilot signal is inserted may be set for the propagation channel estimation value.

Figure 14:
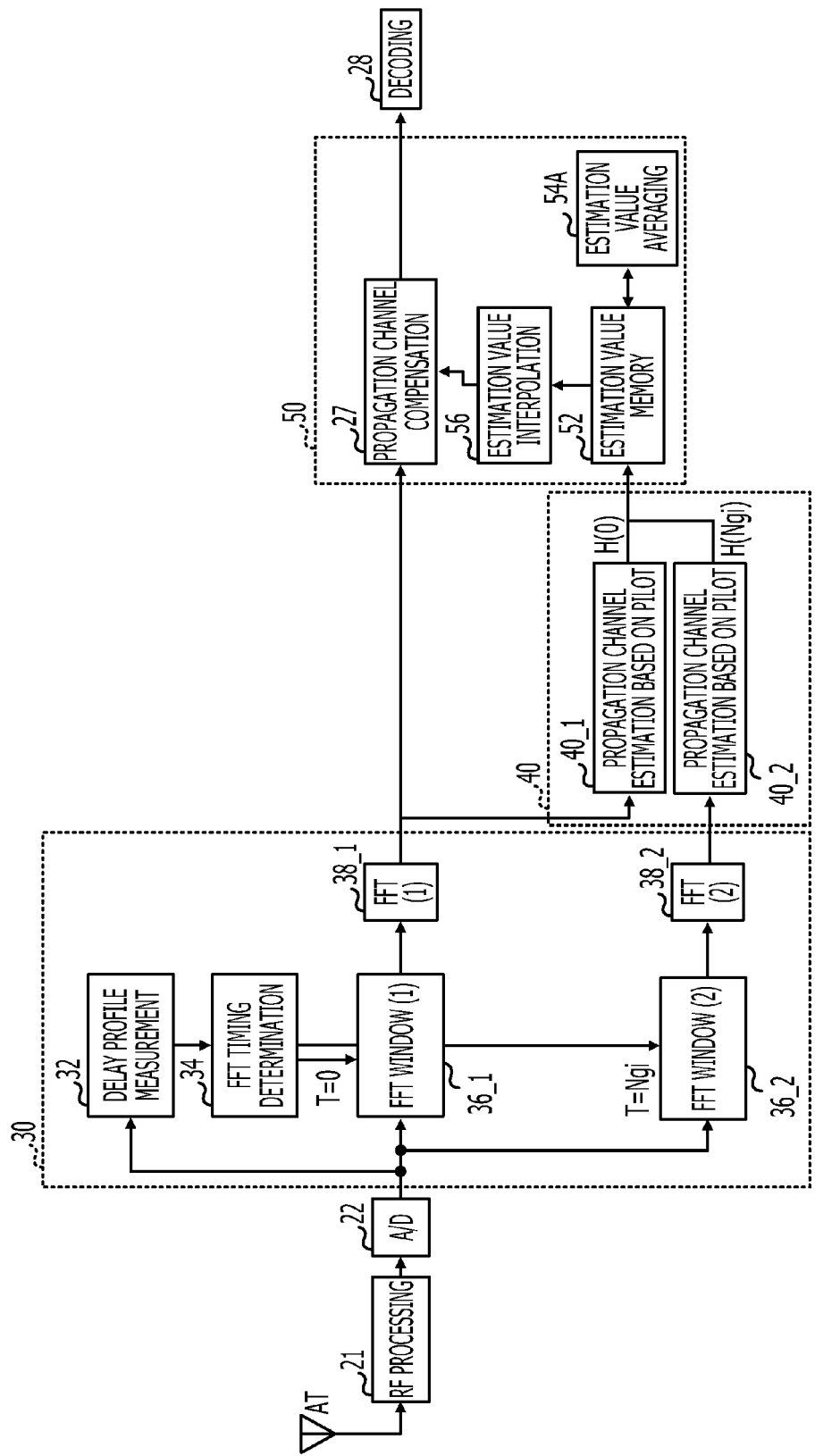
FIG. 14 illustrates an exemplary reception device.

FIG. 14 illustrates an exemplary reception device. A reception device illustrated in FIG. 14 may be a reception device based on the OFDM communication method or the OFDMA communication method. In substantially the same way as the reception device illustrated in FIG. 6, the reception device based on the OFDM communication method includes an RF processing circuit 21 for down-converting a reception signal received by an antenna AT and performing orthogonal demodulation on the down-converted reception signal and an A/D conversion circuit 22. A digital signal subjected to A/D conversion may be an OFDM signal in a temporal domain. An FFT circuit 30 in the reception device fast-fourier-transforms the OFDM signal including a guard interval and a valid symbol for a first symbol into which the pilot signal is inserted, using a plurality of FFT windows having different timings.

A propagation channel estimation unit 40 in the reception device extracts a plurality of pilot signals of OFDM signals subjected to FFT process based on the plurality of FFT windows, and estimates a plurality of propagation channel characteristics in the first symbol based on the pilot signals by using a plurality of estimation units, for example, two estimation units 40 1 and 40 2.

A propagation channel compensation circuit 50A includes an estimation value averaging processing circuit 54A for obtaining the plurality of propagation channel estimation values of each first symbol, for example, the average value of the plurality of propagation channel estimation values 60 illustrated in FIG. 9. Therefore, a noise included in the propagation channel estimation value of the first symbol may be reduced.

The average value may be stored in an estimation value memory 52, as a representative propagation channel estimation value. For example, an estimation value interpolation processing circuit 56 may estimate the propagation channel characteristic of a second symbol into which no pilot signal is inserted by performing linear interpolation between representative propagation channel estimation values. A propagation channel compensation circuit 27 removes the estimation value of the propagation channel characteristic from a fast-fourier-transformed OFDM signal in the second symbol. A decoding circuit 28 decodes a signal subjected to propagation channel compensation.

Propagation channel estimation values at a plurality of timings are obtained based on one pilot signal, and the average value of the plurality of propagation channel estimation values is set as the representative propagation channel estimation value. Therefore, a noise component occurring at each timing may be reduced, and the propagation channel estimation value is obtained with a high degree of accuracy.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

The invention claimed is:

1. A reception device comprising:
a fast-fourier-transform (FFT) circuit to FFT a first Orthogonal Frequency Division Multiplexing (OFDM) signal using a plurality of FFT windows that includes different timings within a symbol length period and a second OFDM signal, the first OFDM signal including a plurality of first symbols with a pilot signal and a guard interval, the second OFDM signal including a second symbol without the pilot signal;
a propagation channel estimation circuit to extract the pilot signals from the fast-fourier-transformed first OFDM signals, and estimate a plurality of propagation channel characteristics of the plurality of first symbols based on the pilot signals; and
a propagation channel compensation circuit to obtain a propagation channel characteristic of the second symbol based on the plurality of propagation channel characteristics, and remove the propagation channel characteristic of the second symbol from the fast-fourier-transformed second OFDM signal.

2. The reception device according to claim 1, wherein the propagation channel compensation circuit obtains the propagation channel characteristic of the second symbol based on inclinations indicating variations of the plurality of propagation channel characteristics.

3. The reception device according to claim 2, wherein the propagation channel compensation circuit obtains the propagation channel characteristic of the second symbol located between the plurality of the first symbols based on the inclinations of the plurality of propagation channel characteristics and times of the plurality of first symbols.

4. The reception device according to claim 2, wherein the propagation channel compensation circuit obtains a propagation channel characteristic curve between a plurality of the first symbols based on the inclinations of the plurality of propagation channel characteristics and times of the plurality of first symbols, and obtains the propagation channel characteristic of the second symbol located between the plurality of first symbols based on the propagation channel characteristic curve.

5. The reception device according to claim 4, wherein the propagation channel characteristic curve includes a quadratic function or a spline function.

6. The reception device according to claim 2, wherein the propagation channel compensation circuit calculates the inclinations based on the plurality of propagation channel characteristics using a least-square method.

7. The reception device according to claim 2, wherein the propagation channel compensation circuit calculates a propagation channel characteristic straight line of the plurality of first symbols based on the inclinations and a time of the plurality of first symbols, and obtains a first propagation channel characteristic of the second symbol based on an intersection point between the propagation channel characteristic straight line and a time of the second symbol.

8. The reception device according to claim 7, wherein the propagation channel compensation circuit converts an inclination of the propagation channel characteristic straight line of the plurality of first symbols so that the inclination of the propagation channel characteristic straight line of the plurality of first symbols approaches to an inclination of the propagation channel characteristic straight lines of adjacent first symbols, and obtains a second propagation channel characteristic of the second symbol based on an intersection point between the converted propagation channel characteristic straight line and the time of the second symbol.

9. The reception device according to claim 8, wherein the propagation channel compensation circuit selects a propagation channel characteristic, based on the propagation channel characteristic of the plurality of first symbols, from among the first propagation channel characteristic of the second symbol and the second propagation channel characteristic of the second symbol.

10. The reception device according to claim 1, wherein the FFT circuit sets the timings of the plurality of FFT windows within a first overlapping period in which a main wave and a preceding wave overlap with each other, a second overlapping period in which the main wave and a delayed wave overlap with each other, or an third overlapping period in which the main wave, the preceding wave, and the delayed wave overlap with one another.

11. The reception device according to claim 10, wherein the timings of the plurality of FFT windows include at least an FFT window having an earliest timing and an FFT window having a latest timing within the first overlapping period, the second overlapping period and the third overlapping period.

12. The reception device according to claim 1, wherein the propagation channel estimation circuit averages the plurality of propagation channel characteristics and estimates a representative propagation channel characteristic of the plurality of first symbols, and the propagation channel compensation circuit obtains the propagation channel characteristic of the second symbol based on the representative propagation channel characteristic of the plurality of first symbols, and removes the propagation channel characteristic of the second symbol from the fast-fourier-transformed second OFDM signal.

13. A receiving method comprising:
fast-fourier-transforming a first Orthogonal Frequency Division Multiplexing (OFDM) signal using a plurality of fast-fourier-transform (FFT) windows that have different timings within a symbol length period and a second OFDM signal, the first OFDM signal including a plurality of first symbols with a pilot signal and a guard interval, the second OFDM signal including a second symbol without the pilot signal;
extracting the pilot signals from the fast-fourier-transformed first OFDM signals;
estimating a plurality of propagation channel characteristics of the plurality of first symbols based on the pilot signals;
obtaining a propagation channel characteristic of the second symbol based on inclinations indicating variations of the plurality of propagation channel characteristics; and
removing the propagation channel characteristic of the second symbol from the fast-fourier-transformed second OFDM signal.

14. A receiving method comprising:
fast-fourier-transforming a first Orthogonal Frequency Division Multiplexing (OFDM) signal using a plurality of fast-fourier-transform (FFT) windows that have different timings within a symbol length period and a second OFDM signal, the first OFDM signal including a plurality of first symbols with a pilot signal and a guard interval, the second OFDM signal including a second symbol without the pilot signal;
extracting the pilot signals from the fast-fourier-transformed first OFDM signals;
obtaining a plurality of propagation channel characteristics of the plurality of first symbols based on the pilot signals;
averaging the plurality of propagation channel characteristics and estimating a representative propagation channel characteristic of the plurality of first symbols;
obtaining a propagation channel characteristic of the second symbol based on the representative propagation channel characteristic of the plurality of first symbols; and
removing the propagation channel characteristic of the second symbol from the fast-fourier-transformed second OFDM signal.

* * * * *